(12) United States Patent
Cabrelle et al.

(10) Patent No.: US 11,175,049 B2
(45) Date of Patent: Nov. 16, 2021

(54) ECONOMICAL AND VERSATILE SYSTEM FOR FIXING A HOB IN A WORKTOP

(71) Applicant: WHIRLPOOL CORPORATION, Benton Harbor, MI (US)

(72) Inventors: Elio Cabrelle, Comerio (IT); Luca Miraglia, Comerio (IT)

(73) Assignee: Whirlpool Corporation, Benton Harbor, MI (US)

( * ) Notice: Subject to any disclaimer, the term of this patent is extended or adjusted under 35 U.S.C. 154(b) by 313 days.

(21) Appl. No.: 16/273,426

(22) Filed: Feb. 12, 2019

(65) Prior Publication Data

US 2019/0170367 A1    Jun. 6, 2019

Related U.S. Application Data

(60) Division of application No. 14/977,796, filed on Dec. 22, 2015, now Pat. No. 10,247,423, which is a (Continued)

(51) Int. Cl.
*H05B 3/68* (2006.01)
*F24C 15/10* (2006.01)
(Continued)

(52) U.S. Cl.
CPC ............ *F24C 15/108* (2013.01); *B25B 27/00* (2013.01); *F16B 2/241* (2013.01); *F16B 2/243* (2013.01); *Y10T 29/53909* (2015.01)

(58) Field of Classification Search
CPC .......... B25B 27/00; F16B 2/241; F16B 2/243; F24C 3/08; F24C 3/082; F24C 3/085; F24C 15/108; Y10T 29/53909; H05B 3/74–748
(Continued)

(56) References Cited

U.S. PATENT DOCUMENTS 2,888,684 A *  6/1959  Icenhower ............. A47B 77/06
                                                    52/716.1
3,386,108 A     6/1968  Juergens
                        (Continued)

FOREIGN PATENT DOCUMENTS

EP    2116775 A1 * 11/2009 ............ F24C 15/108
GB    2241980 A     9/1991
WO    2007082563 A1  7/2007

OTHER PUBLICATIONS

Italian Patent Application IT-VA20110038 filed Dec. 22, 2011, Applicant: Whirlpool, IT search report re: same dated Jul. 9, 2012.

*Primary Examiner* — Sang Y Paik
(74) *Attorney, Agent, or Firm* — Price Heneveld LLP

(57) ABSTRACT

A cooking hob retention system includes a support element having a major surface and a pocket disposed therealong and defining a strip having a first opening and a second opening on vertically opposite sides thereof. The system also includes a fastening element including an engagement end and a free end resiliently compressible toward the engagement end about a central fold disposed therebetween. The engagement end is coupled with the support element by a deformable portion opposite the central fold received within the first opening and a protruding element extending toward the deformable portion and received within the second opening. The free end includes a body defining an acute angle with respect to the engagement end. A tab extends from the body generally parallel to the engagement end, and a first countering element extends from the body beyond the tab to an end thereof.

18 Claims, 4 Drawing Sheets

Related U.S. Application Data continuation of application No. 13/723,709, filed on Dec. 21, 2012, now Pat. No. 9,243,808.

(51) Int. Cl.
  *B25B 27/00* (2006.01)
  *F16B 2/24* (2006.01)
(58) Field of Classification Search
  USPC ........... 219/443.1–468.2; 126/211, 218, 216, 126/214 A
  See application file for complete search history.

(56) References Cited

U.S. PATENT DOCUMENTS

| | | | |
|---|---|---|---|
| 3,993,272 | A | 11/1976 | Lindeman |
| 6,410,892 | B1 * | 6/2002 | Peschl ................... F24C 15/102 126/218 |
| 8,944,044 | B2 | 2/2015 | Buck et al. |
| 9,243,808 | B2 | 1/2016 | Cabrelle et al. |
| 2008/0315201 | A1 | 12/2008 | Ohmi et al. |
| 2011/0073420 | A1 | 3/2011 | Nagel |

\* cited by examiner

ECONOMICAL AND VERSATILE SYSTEM FOR FIXING A HOB IN A WORKTOP

CROSS-REFERENCE TO RELATED APPLICATIONS

This application is a division of U.S. application Ser. No. 14/977,796, filed Dec. 22, 2015, now U.S. Pat. No. 10,247,423, entitled "ECONOMICAL AND VERSATILE SYSTEM FOR FIXING A HOB IN A WORKSHOP," which is a continuation of U.S. Ser. No. 13/723,709, filed on Dec. 21, 2012, now U.S. Pat. No. 9,243,808, entitled "ECONOMICAL AND VERSATILE SYSTEM FOR FIXING A HOB IN A WORKSHOP," the disclosures of which are hereby incorporated herein by reference in their entirety.

TECHNICAL FIELD

The present disclosure provides a combination of a fixing element and a support element for a hob in a worktop into which the hob is to be installed.

BACKGROUND

EP1977169B1 discloses a combination of a fixing element with a support element in which the fixing element comprises a spring and is made up of a substantially planar and linear resilient element, the first end of which is free while the second end is constrained to the support element. The linear arrangement of the spring exhibits the disadvantage of reducing the compression force which the spring is capable of exerting against the structural element in the installed configuration of the hob. This reduced compression force does not effectively prevent the installed hob from lifting from the contact surface of the worktop, which results in infiltration of liquids accidentally spilled on the worktop or used for example during cleaning of the worktop. Moreover, the elongate arrangement of the spring means that the constrained end thereof must be fixed at a level sufficiently below the surface of the worktop to enable the spring to engage effectively and exert its resilient action. This type of limitation entails modifications to the structure of the hobs, especially for those which are of a thinner design, if it is to be possible to use the same fixing element with a variety of models of hob. Furthermore, unlatching of the spring from the wall of the cut surface in the worktop with which the latter is engaged may only be effected from beneath the installed hob. As a consequence, in the event of repair or maintenance of the hob, anything located beneath it (for example an oven built into the same cabinet or drawers) must be removed to provide access.

U.S. Pat. No. 3,386,108 discloses a combination of a support element and a fixing element in which the fixing element is engaged beneath the support element and the installed hob is held in place in the worktop by means of a tie rod which is screwed in under the worktop. Said solution is highly complex and difficult to adapt to the various depths of hobs and work surfaces which are currently distributed commercially.

Finally, GB2241980A discloses a combination of a fixing element and a support element according to the preamble of the main claim. The fixing element described therein is a resilient element removably fixed to a profile of the hob structure by welding, riveting or by means of screws, so making the solution costly in terms of assembly. Said solution provides a V-shaped resilient element in which one end is constrained and the second is free. A tab-like surface extends from the latter in a substantially orthogonal direction for the purpose of creating a surface which engages with the lower edge of the worktop with the aim of providing resistance to lifting of the hob installed in the worktop.

Said known solution cannot be adapted to the various depths of worktop into which a hob may be installed. It is thus not a "universal" solution. Furthermore, for this hob too, unlatching of the fixing means may only be effected by working from the underside of the worktop.

SUMMARY

The object of the present disclosure is therefore to provide a combination of a fixing element and support element for a hob which overcomes the above-stated disadvantages and is simple and economical to manufacture.

According to the disclosure, said object is achieved thanks to the features set out in the attached claims.

According to an aspect of the present disclosure, a cooking hob retention system includes a support element having a major surface and a pocket disposed along the major surface and defining a strip having a first opening and a second opening on vertically opposite sides thereof. The system also includes a fastening element including an engagement end and a free end resiliently compressible toward the engagement end about a central fold disposed between the engagement end and the free end. The engagement end is coupled with the support element by a deformable portion opposite the central fold received within the first opening and a protruding element extending toward the deformable portion and received within the second opening. The free end includes a body defining an acute angle with respect to the engagement end. A tab extends from the body generally parallel to the engagement end, and a first countering element extends from the body beyond the tab to an end thereof.

According to another aspect of the present disclosure, a cooking hob includes a housing defining an outer periphery, a sheet coupled with the housing and extending outwardly beyond the outer periphery, and a support element disposed along a portion of the outer periphery of the housing and coupled therewith. The support element includes a major surface and a pocket disposed therealong. The cooking hob also includes a fastening element having an engagement end and a free end resiliently compressible toward the engagement end about a central fold disposed between the engagement end and the free end. The engagement end is coupled with the support element. The free end includes a body defining an acute angle with respect to the engagement end, a first countering element extending from the body beyond the tab to an end thereof, and a tab extending from the body generally parallel to the engagement end to a position adjacent to a lower surface of the sheet. A distance between the end of the tab and the lower surface is sufficient to permit movement of the tab toward the support element by compression of the fastening element at least within the central fold.

According to another aspect of the present disclosure, a method for removing a cooking hob from an opening in a carrier element includes inserting a planar element between a sheet of the cooking hob extending over the opening and an adjacent surface of the carrier element such that a leading edge of the carrier element contacts a tab of a fastening element having a free end bearing the tab and an engagement end coupled with a housing of the cooking hob extending from the sheet and at least partially within the opening. The free end of the fastening element has a portion thereof engaged with an interior surface of the opening. The method further includes forcing the planar element inwardly with respect to the opening so as to cause compression of the fastening element at least within a central fold connecting the free end with the engagement end by movement of the tab with the planar element such that the portion of the fastening element disengages from the interior surface of the opening.

According to another aspect of the present disclosure, a method for associating a cooking hob with an opening in a carrier element includes installing the cooking hob in the opening in the carrier element by aligning the outer periphery of a of the cooking hob housing with the opening from above a surface of the cooking hob and lowering the cooking hob into the opening until a sheet of the cooking hob extending over the opening contacts the surface of the carrier element. The lowering initially engaging a portion of a fastening element having a free end bearing a tab coupled with the housing of the cooking hob extending from the sheet with an interior surface of the opening under an initial compression of the fastening element. The method further includes inserting a planar element between the sheet of the cooking hob the adjacent surface of the carrier element to bring a leading edge of the planar element into contact with a tab of a fastening element and forcing the planar element inwardly with respect to the opening to compress the fastening element until the portion of the fastening element disengages from the interior surface of the opening.

These and other features, advantages, and objects of the present device will be further understood and appreciated by those skilled in the art upon studying the following specification, claims, and appended drawings.

DETAILED DESCRIPTION OF EMBODIMENTS

Figure 1:
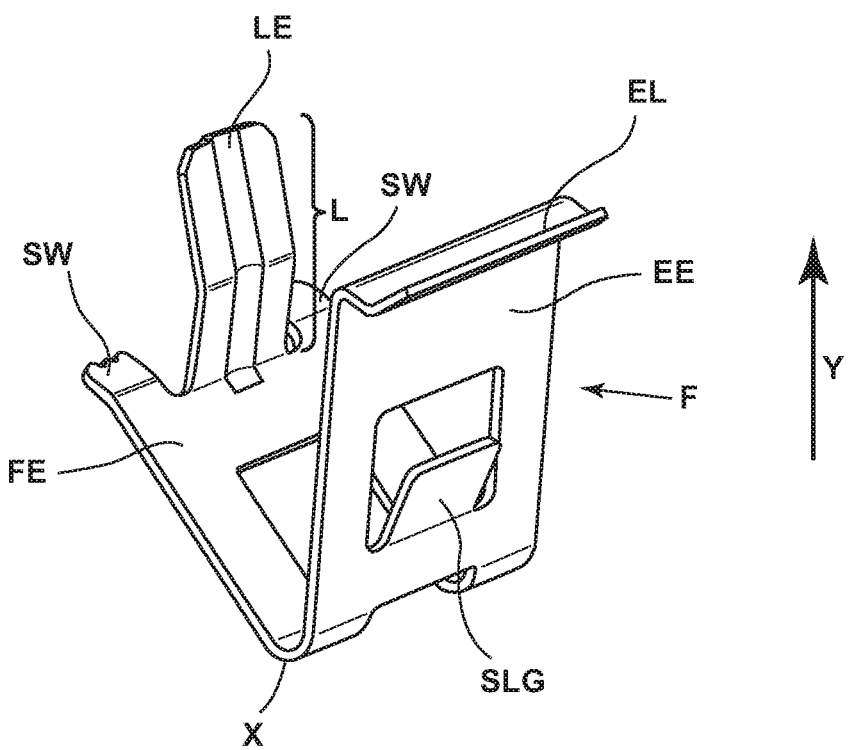
FIGS. 1, 2 and 3 respectively show a perspective view, a side view and a plan view of a preferred configuration of the fixing device of the present disclosure.
Figure 2:
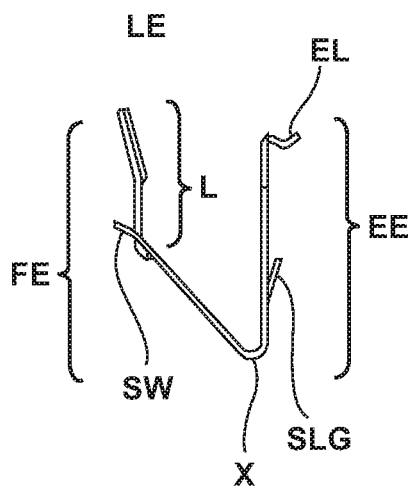

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the above-stated figures, a hob H is described, in particular an electric hob, comprising a sheet G of vitreous ceramic material fixed in known manner to a housing C located therebeneath, the latter being capable of containing both the heating elements and the power supply and control means for said elements.

The sheet G has an upper surface on which the pans are normally placed when foodstuffs are being cooked, and a lower surface L joined to the housing C and concealed from view when the hob is installed in a carrier element W, such as for example a worktop. A sealing gasket (not shown) may be arranged around the periphery of the frame or between the carrier element W of the worktop and the sheet G, to prevent water from getting inside housing C therebeneath.

It is known from the prior art that a worktop W in which the hob H is to be installed has an opening, usually rectangular in shape, into which the hob H is to be inserted and fixed for subsequent use.

The worktop is usually of wood or marble, but may be of synthetic material or be made from a plurality of materials.

The housing C of the hob H is preferably made of metal or plastics material or and has peripheral vertical walls in which are located support elements or portions. According to the disclosure, the housing C is coupled to the carrier element W in which it is installed, by means of at least one support element S, which is in turn coupled to at least one fixing element F.

Advantageously, each support element S is a pocket-like seat P, wherein each pocket is provided with a central strip B for the fixing element F and with two slots HI and LO located at the opposite ends of said central strip B. Advantageously, the central strip B protrudes towards the outside of the housing C relative to the vertical plane of the peripheral wall. In the case of a sheet metal housing, said strip is a region of sheet metal obtained by means of two parallel cuts in the sheet metal and necessarily plastically deformed outwards.

According to a preferred embodiment, the fixing element F comprises a resilient device (EE, X, FE), preferably a V-shaped hook which, when assembled with the support element S, has a free end FE opposite to a constrained end EE and capable of coupling to said support means S. The V-shaped hook preferably comprises a fold X located between said constrained end EE and said free end FE, in which the vertex is in a portion opposite to said ends. In alternative embodiments (not shown), the resilient element E comprises further concertina-like central folds in an odd number so that the both free end FE and the constrained end EE are always on the same side relative to the central fold X. The presence of one or more folds between the free end FE and the constrained end EE increases the resilient force which the spring is capable of exerting, in particular against the vertical wall of the incision in the worktop when the support of the component, in particular a hob, is installed therein. This increased force opposes lifting of the hob installed in the worktop, so improving the resistance of the assembly to infiltration by liquids, such as for example those used for cleaning and liquids which overflow accidentally during use of the hob H.

Unlatching of the fixing element F assembled with the support S from the carrier element W, i.e. in the assembled configuration of the combination, is effected by compressing the free end FE of the fixing element F. Compression CX of the free end of the fixing element, shown in FIG. 8, releases the resilient element from engagement against the vertical wall of the incision in the worktop so enabling extraction of the hob from the seat.

According to the disclosure, the free end FE of the fixing element comprises a tab-like portion L which extends substantially in a direction Y parallel to the constrained end. In a preferred embodiment, the tab-like portion L is capable of permitting unlatching of the fixing element F assembled with the support element S of the component from the carrier element W by means of a compression action exerted on said portion L, in particular when the hob is installed in a worktop. The extent and shape thereof are such as to permit latching and compression thereof by bringing the end portion LE thereof closer to the lower surface of the sheet G, during the unlatching operation, but without interfering with said sheet. This arrangement makes it possible to unlatch the fixing element F with access being gained from the upper side U of the carrier element W, the worktop, without there being any need to work from the underside thereof.

Figure 7:
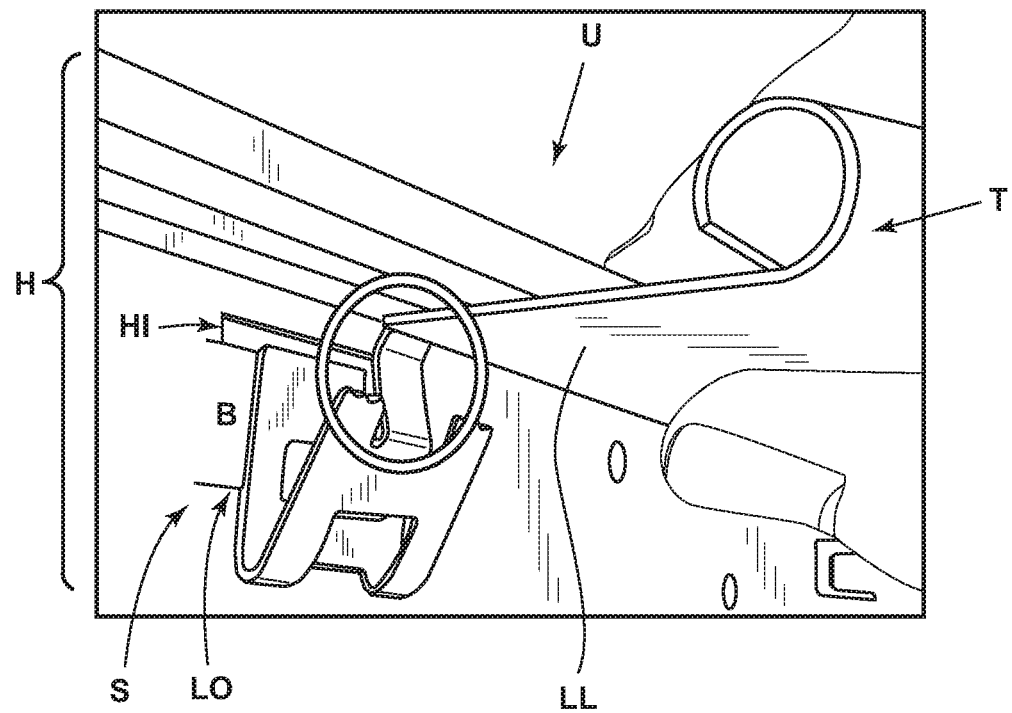
FIG. 7 describes the compression of the resilient element of the fixing device of the preceding figures carried out with a tool which acts on the free end of the fixing element.
Figure 8:
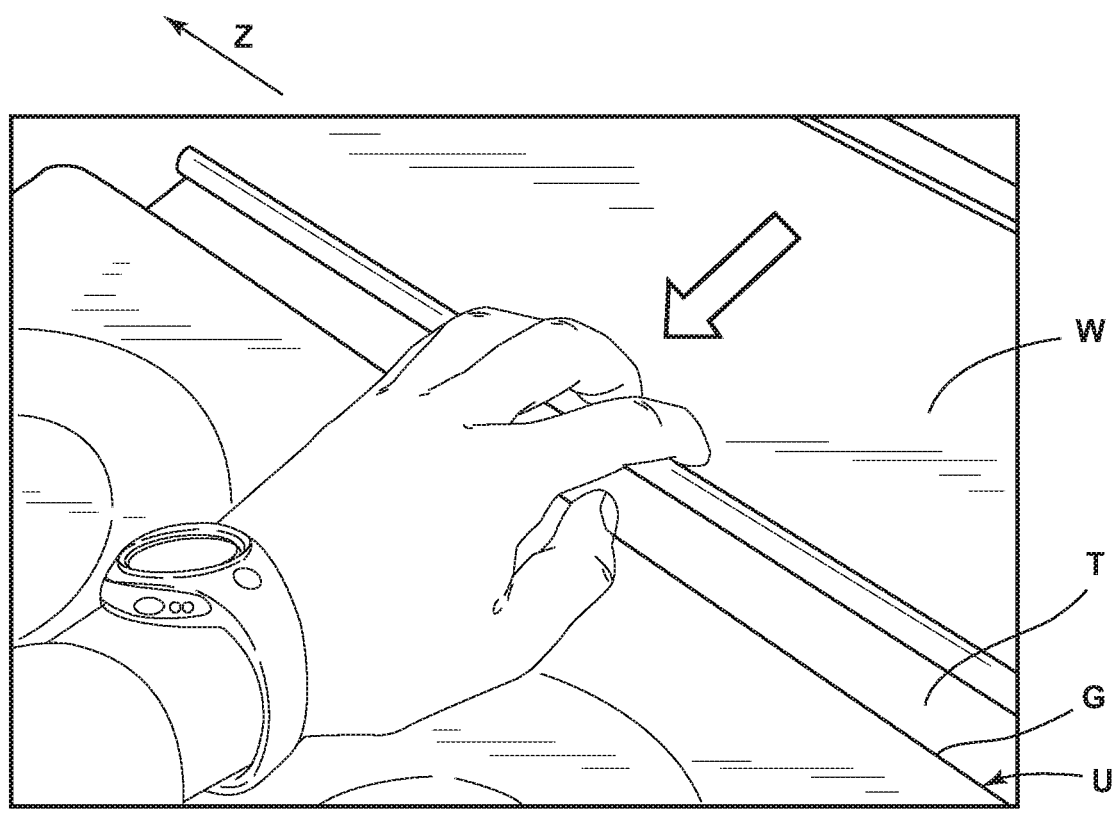
FIGS. 8 and 9 describe the sequence for uninstalling a hob using a tool with a portion having a flat profile.
Figure 9:
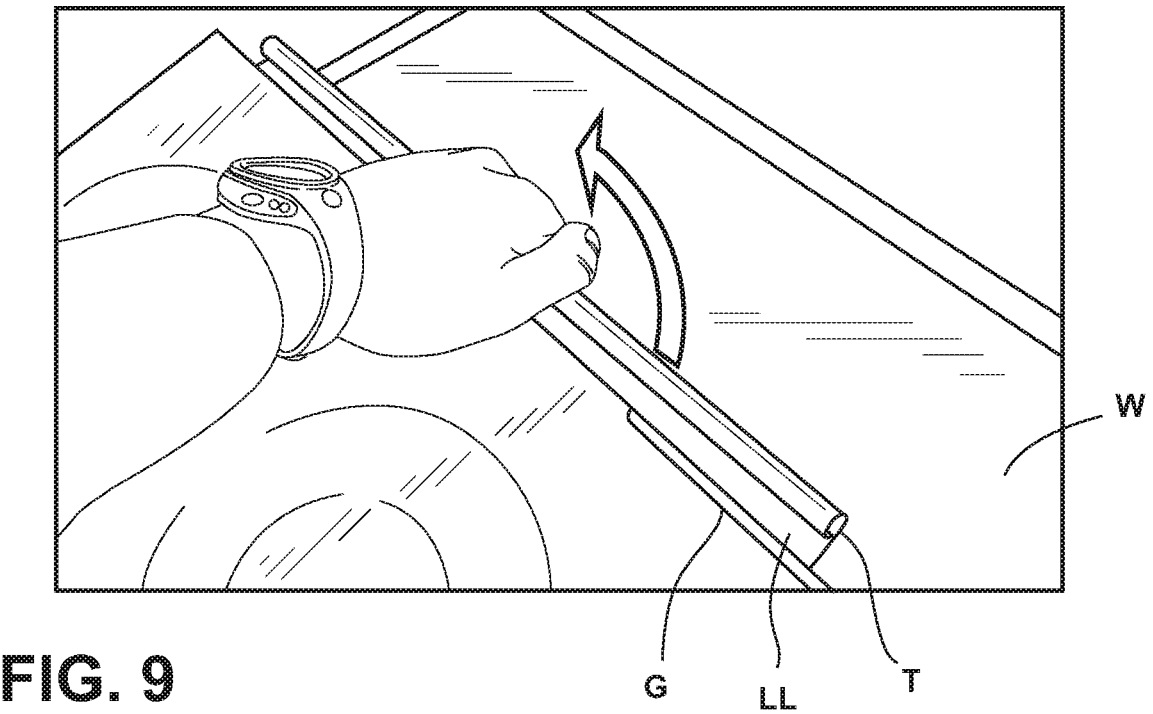

Advantageously, a tool T may be provided for unlatching the fixing element F assembled with the support element S of a component H, in particular for unlatching a hob H from a carrier element W, the latter in particular being a frame which supports or surrounds the hob. Advantageously, the tool T is configured for unlatching a plurality of fixing elements F, in particular being configured so as to be capable of exerting virtually simultaneous compression on a plurality of tabs, preferably arranged in a rectilinear direction Z, as shown in the sequence of FIGS. 7, 8 and 9.

Said tool T preferably has a portion having a flat profile LL, for example a blade, capable of being inserted between the support element of the component S and/or G and/or FR and the worktop W in which it is installed, and is configured for substantially simultaneously compressing a plurality of tabs of said fixing elements.

Figure 3:
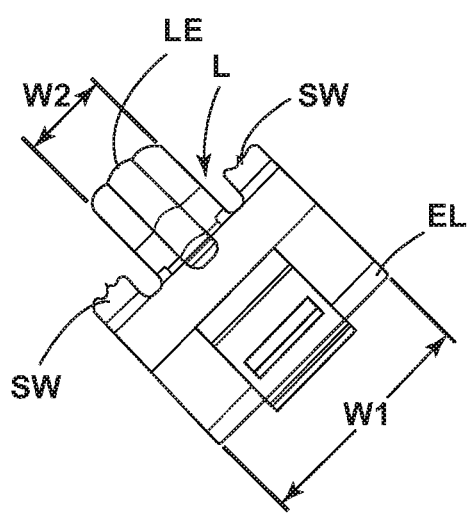

In a preferred embodiment, the free end furthermore comprises means SW for countering lifting of the support element from the carrier element, in the assembled configuration, preferably with a saw-toothed profile, as shown in FIGS. 1 and 3.

Advantageously, coupling between said fixing means F and said support means S may be implemented by applying one or more hooks F to the described pockets P as described below.

Figure 4:
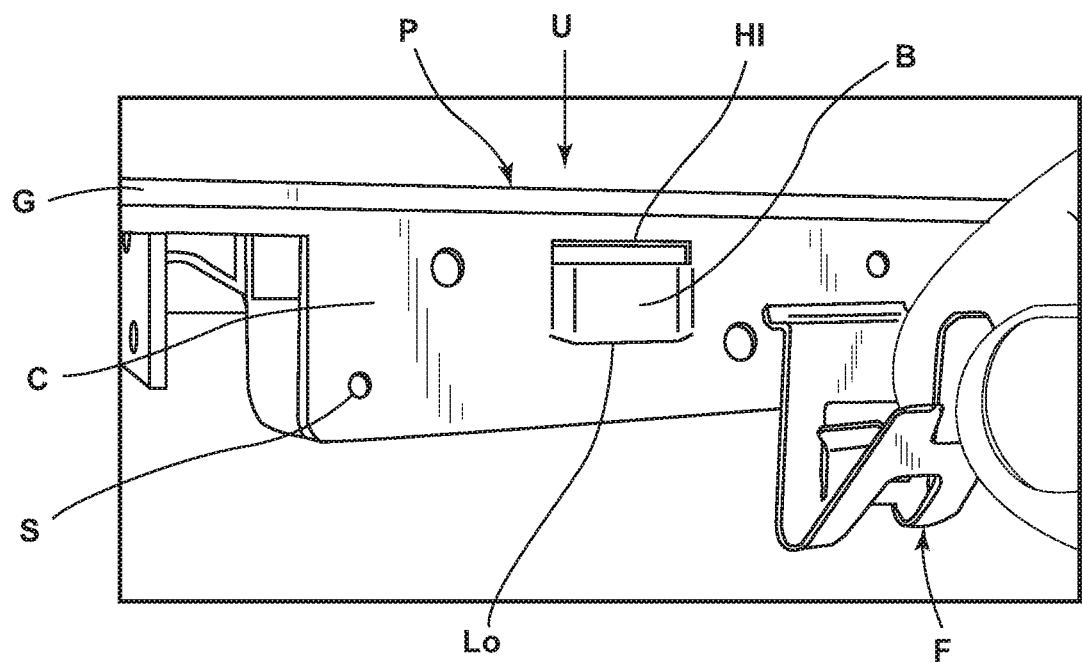
FIG. 4 shows a preferred configuration of the support according to the disclosure with which the fixing device is coupled.
Figure 5:
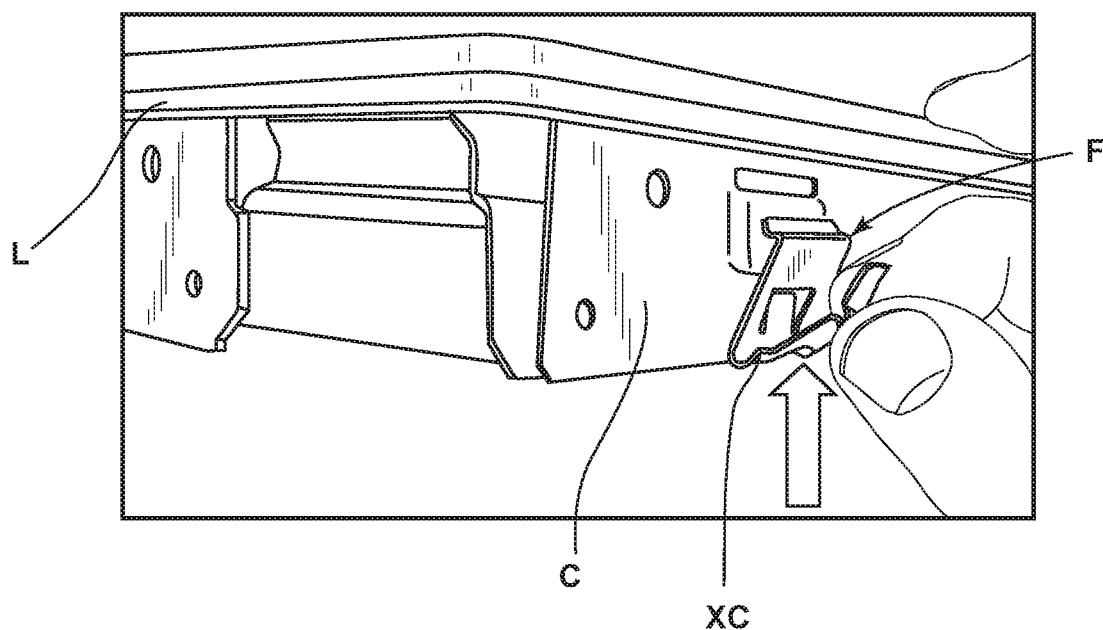
FIGS. 5 and 6 show the operations of connecting the fixing element and the support element described in the preceding figures.
Figure 6:
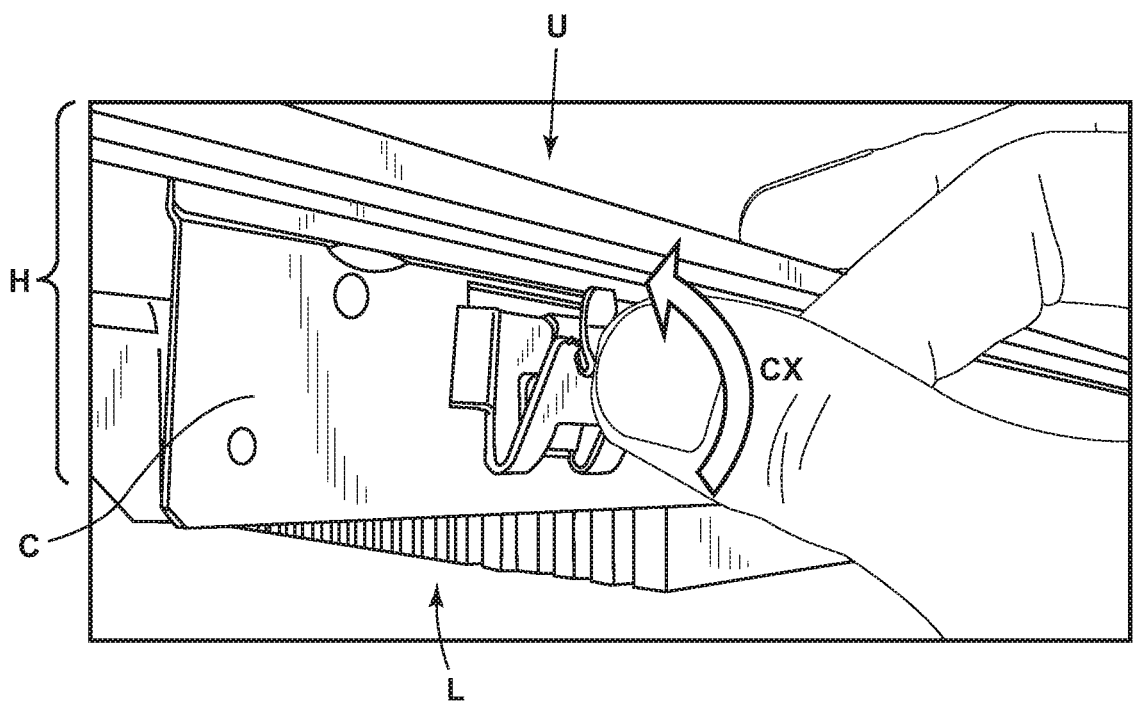

In a preferred configuration of the fixing element, the constrained end thereof incorporates resilient snap-on latching means to said support element S, in particular to the pocket P. Preferably, a protruding element SLG is located in the constrained end EE, which protruding element is capable of being inserted in a slot of the pocket-like seat P, preferably the lower slot LO, and, for latching at the level of a region opposite the pocket P (the upper slot HI in the case shown), a resilient latching element with said central strip B comprising a deformable resilient portion EL. The resilient latching element is opposite to said protruding element SLG and is capable of releasing the hook F, at least on a portion of the central strip, by rotation of the hook around the slide element SLG and by snap-on deformation of a resilient portion EL thereof during coupling with the central strip B. The latching sequence is shown in FIGS. 4, 5 and 6. The fixing element F may preferably be fixed reversibly. In this described configuration, the width W1 of the resilient latching element EL is greater than the width W2 of said tab-like portion L and identical to the width of the free end FE. Other equivalent arrangements are applicable for the same purpose, as are, however, other known reversible coupling methods between the fixing element and the support, such as for example those described in EP1977169, or by means of screws or rivets.

In one preferred variant, the hook is made from spring steel treated against oxidation processes, for example by means of a passivation process such as a burnishing process.

The same device is also applicable to other types of hobs and other built-in household electrical appliances, for example ovens or refrigerators. Further variants of the present disclosure may be obtained by combining the individually described features.

For instance, the combination of a fixing element with a support element in which the fixing element F comprises a resilient fixing element EE, X FE, wherein the fixing element may exert a greater force for countering extraction of the hob H installed in a worktop W, and wherein uninstallation of the installed hob is a rapid procedure for the operator who may work from the upper side U of the hob, without there being any need for further operations to gain access to the lower portion of said hob. Furthermore, the combination according to the disclosure makes it possible to install and fix said hob of a known depth in any currently commercially available worktop. The combination according to the disclosure thus assumes the nature of an economical and universal fixing system.

More generally, a description has been provided of a combination of a fixing element and a support element which is economical and versatile for wider use.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A method for removing a cooking hob from an opening in a carrier element, comprising:
   inserting a planar element between a sheet of the cooking hob extending over the opening and an adjacent surface of the carrier element to bring a leading edge of the planar element into contact with respective tabs of a plurality of fastening elements disposed along a side of the housing, each of the plurality of tabs having a free end bearing the tab and an engagement end coupled with a housing of the cooking hob extending from the sheet and at least partially within the opening, the respective free ends of the fastening elements each having a portion thereof engaged with an interior surface of the opening, wherein the planar element defines a width such that, when the planar element is inserted between the sheet and the adjacent surface of the carrier element in a direction normal to the width, the leading edge of the planar element simultaneously contacts each of the plurality of tabs; and
   forcing the planar element inwardly with respect to the opening to compress the fastening elements, at least within a respective central fold connecting the free end with the engagement end by movement of the tabs with the planar element, until the portions of the fastening elements disengage from the interior surface of the opening.

2. The method of claim 1, further including forcing an end of the planar element opposite the tabs away from the adjacent surface of carrier element to lift the cooking hob at least partially out from the opening.

3. The method of claim 2, further including, after lifting the cooking hob at least partially out from the opening, removing the fastening elements from the cooking hob by pulling on the free ends in a direction opposite a direction of the compression.

4. The method of claim 1, wherein the cooking hob is first installed in the opening in the carrier element by aligning the outer periphery of the housing with the opening from above the surface and lowering the cooking hob into the opening until the sheet contacts the surface of the carrier element, such lowering initially compressing the fastening elements against the interior surface of the opening.

5. The method of claim 4, wherein:
   the initial compression of the fastening elements causes a force to be applied by the portion of the respective free ends in contact with the interior surface of the opening to engage therewith so as to counter a force attempting to raise the hob out of the opening; and
   the initial compression is less than the compression of the fastening elements achieved by forcing the planar element inwardly with respect to the opening.

6. The method of claim 4, wherein the free ends are resiliently compressible toward the engagement end about a central fold disposed between each of the engagement end and the respective free ends.

7. The method of claim 4, further including, prior to the cooking hob being first installed in the opening in the carrier element, assembling the fastening elements with the cooking hob by engaging a respective protruding element of each of the fastening elements within respective first openings in the cooking hob and engaging a respective deformable element of each of the fastening element with respective second openings in the cooking hob.

8. The method of claim 7, wherein:
   the cooking hob includes support element including a major surface and a pocket disposed along the major surface and defining a strip, the first opening and a second opening being defined on vertically opposite sides of the strip; and
   assembling the fastening element with the cooking hob covers the strip.

9. The method of claim 4, wherein:
   lowering the cooking hob into the opening brings a first countering element extending from the body beyond the tab into contact with the interior surface of the opening; and
   the engagement of the first countering element with the interior surface of the opening is maintained by the initial compression of the fastening elements.

10. The method of claim 1, wherein the portion of the fastening elements that disengage from the interior surface of the opening when the planar element is forced inwardly with respect to the opening to compress the fastening elements is a respective first countering element extending from reach of the bodies beyond the tab into contact with the interior surface of the opening.

11. The method of claim 10, wherein:
    the tabs are disposed away from the interior surface when the countering elements are engaged with the interior surface of the opening; and
    inserting the planar element between the sheet of the cooking hob extending over the opening and the adjacent surface of the carrier element to bring the leading edge of the planar element into contact with the tabs of the fastening elements includes the leading end of the planar element passing each of the first countering elements.

12. A method for associating a cooking hob with an opening in a carrier element, comprising:
  installing the cooking hob in the opening in the carrier element by aligning the outer periphery of the cooking hob housing with the opening from above a surface of the cooking hob and lowering the cooking hob into the opening until a sheet of the cooking hob extending over the opening contacts the surface of the carrier element, such lowering initially engaging respective portions of a plurality of fastening elements, each having a free end bearing a tab coupled with the housing of the cooking hob extending from the sheet with an interior surface of the opening under an initial compression of the plurality of fastening elements;
  inserting a planar element between the sheet of the cooking hob the adjacent surface of the carrier element to bring a leading edge of the planar element into contact with respective tabs of each of the fastening elements, wherein the planar element defines a width such that, when the planar element is inserted between the sheet and the adjacent surface of the carrier element in a direction normal to the width, the leading edge of the planar element simultaneously contacts each of the plurality of tabs; and
  forcing the planar element inwardly with respect to the opening to compress the fastening elements until the respective portions of the fastening elements disengage from the interior surface of the opening.

13. The method of claim 12, wherein forcing the planar element inwardly with respect to the opening compresses the fastening elements at least within a respective central fold connecting the free ends with a respective engagement end of each of the fastening elements coupled with the cooking hob by movement of the tab with the planar element.

14. The method of claim 12, further including forcing an end of the planar element opposite the tabs away from the adjacent surface of carrier element to lift the cooking hob at least partially out from the opening.

15. The method of claim 14, further including, after lifting the cooking hob at least partially out from the opening, removing the fastening elements from the cooking hob by pulling on the respective free ends in a direction opposite a direction of the compression.

16. The method of claim 12, wherein:
  the initial compression of the fastening elements causes a force to be applied by the portions of the free ends in contact with the interior surface of the opening to engage therewith so as to counter a force attempting to raise the hob out of the opening; and
  the initial compression is less than the compression of the fastening elements achieved by forcing the planar element inwardly with respect to the opening.

17. The method of claim 12, wherein:
  lowering the cooking hob into the opening brings a respective first countering element extending from each of the bodies beyond the tabs into contact with the interior surface of the opening; and
  the engagement of the first countering elements with the interior surface of the opening is maintained by the initial compression of the fastening elements.

18. The method of claim 12, wherein the portions of the fastening elements that disengage from the interior surface of the opening when the planar element is forced inwardly with respect to the opening to compress the fastening elements are respective first countering elements extending from the respective bodies beyond the tab into contact with the interior surface of the opening.

* * * * *